Figure 1:
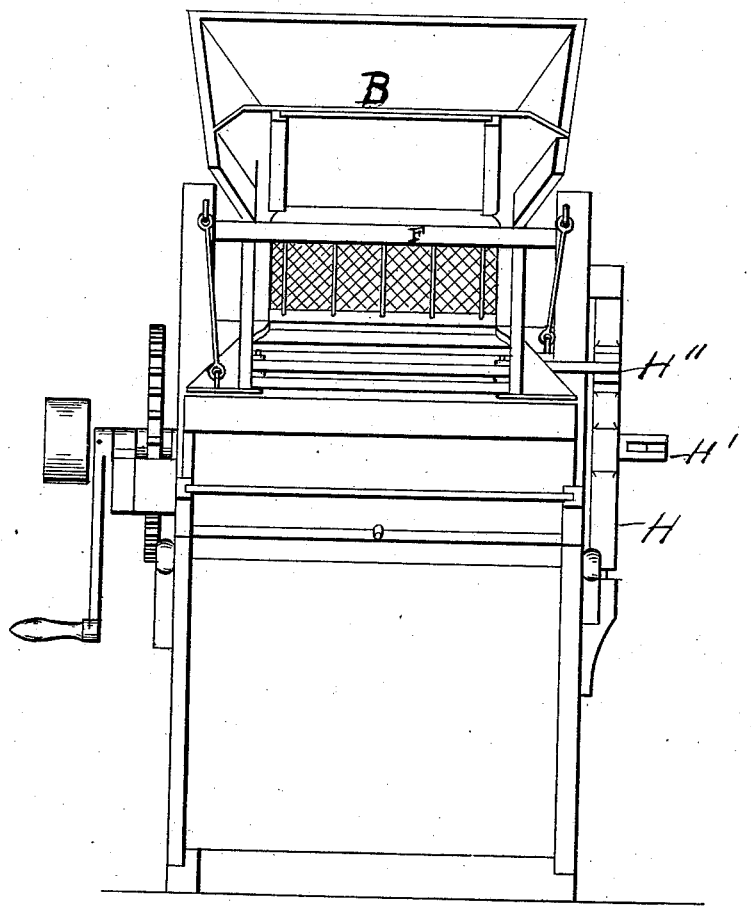

(No Model.)

J. D. & H. HASSELBUSCH.
GRAIN CLEANING MACHINE.

No. 314,123. Patented Mar. 17, 1885.

Attest:
J. L. Hornsby
J. W. Riddle

Inventors:
John D. Hasselbusch
Hermann Hasselbusch
by Paul Bakewell
their attorney (No Model.) 3 Sheets—Sheet 2.
J. D. & H. HASSELBUSCH.
GRAIN CLEANING MACHINE.
No. 314,123. Patented Mar. 17, 1885.
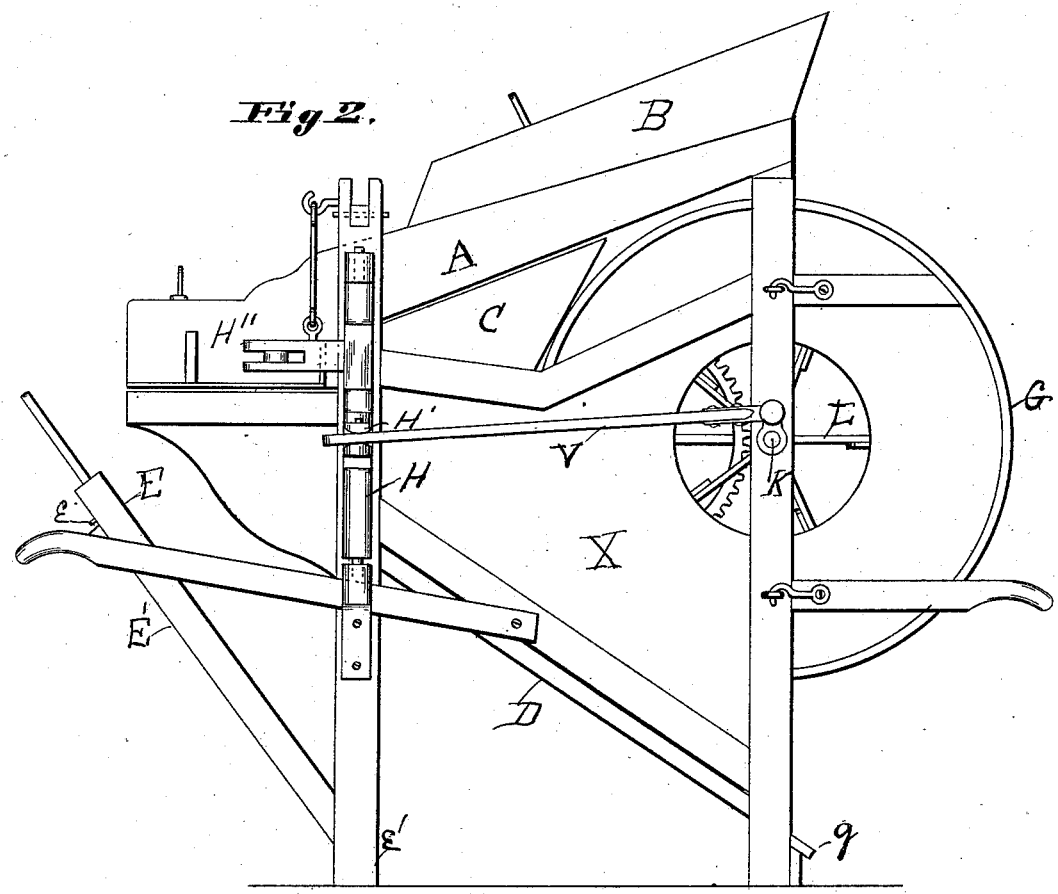
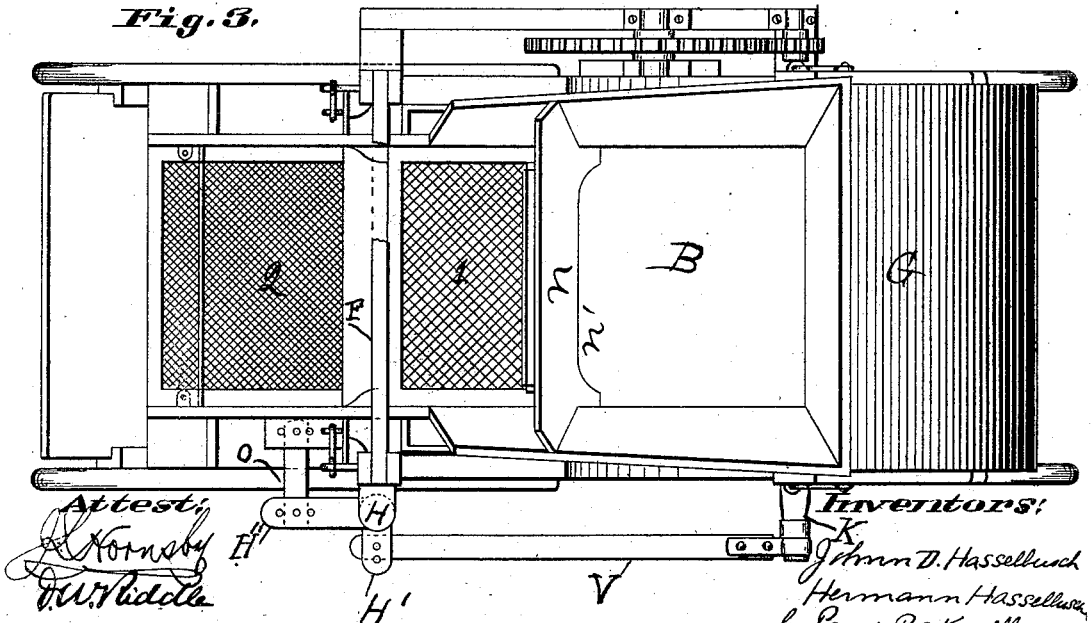

(No Model.) 3 Sheets—Sheet 3.
J. D. & H. HASSELBUSCH.
GRAIN CLEANING MACHINE.
No. 314,123. Patented Mar. 17, 1885.
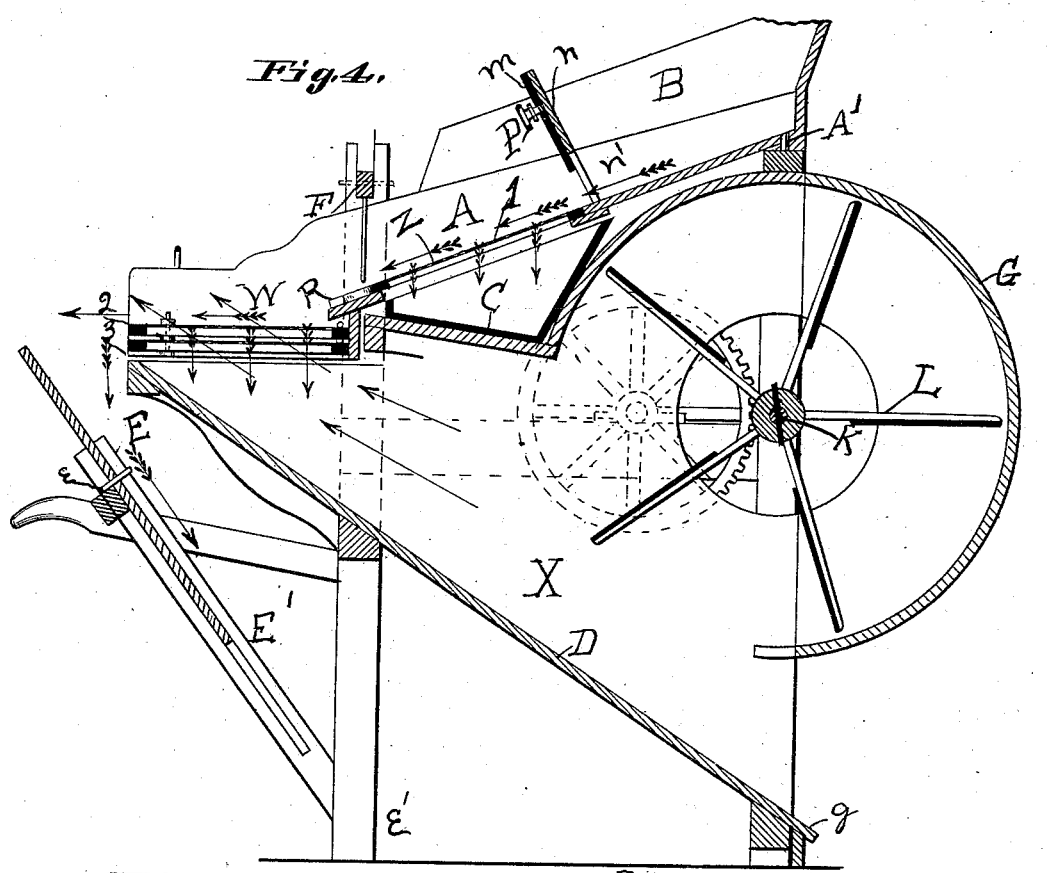
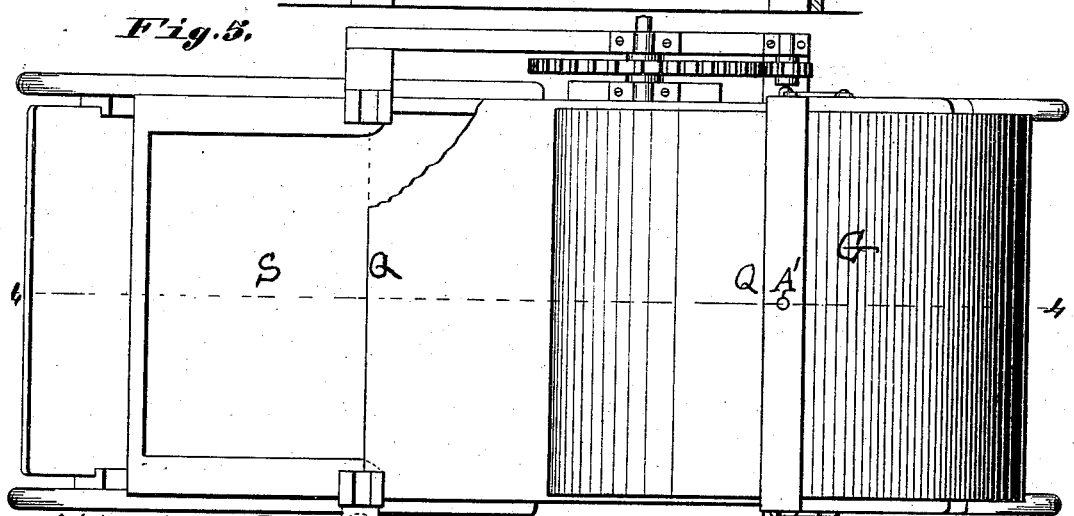
Attest:
J. Hornsby
J. W. Riddle
Inventors:
John D. Hasselbusch
Hermann Hasselbusch
by Paul Bakewell
their attorney

UNITED STATES PATENT OFFICE.

JOHN D. HASSELBUSCH AND HERMANN HASSELBUSCH, OF ST. LOUIS, MO.

GRAIN-CLEANING MACHINE.

SPECIFICATION forming part of Letters Patent No. 314,123, dated March 17, 1885.

Application filed November 10, 1884. (No model.)

*To all whom it may concern:*

Be it known that we, JOHN D. HASSELBUSCH and HERMANN HASSELBUSCH, both of the city of St. Louis, in the State of Missouri, have made certain new and useful Improvements in Grain-Cleaning Machines, of which the following is a full, clear, and exact description, reference being had to the annexed drawings, in which—

Figure 1 is a front elevation of our improved machine; Fig. 2, a side elevation of the same; Fig. 3, a top view of the same; Fig. 4, a longitudinal vertical section on line 4 4 of Fig. 5; Fig. 5, top view of machine with shaker removed.

Our invention relates to the construction of a machine in which grain is cleaned by passing over oscillating sieves, through which a draft is continually made to pass while the sieves are in motion, and in particular to the construction and arrangement of the parts of such a machine, as hereinafter described and claimed.

The machine comprises a pivoted shaker, consisting of a hopper to receive the grain to be cleaned, and a series of sieves to sift the grain in cleaning it, a rake to gather large particles, pieces of straw, and the like, to prevent their mixing with the cleaned grain, a removable box to collect particles of dirt and foreign matter, a fan to create a draft to separate the grain from foreign matter, an inclined bottom to carry off cleaned grain, an adjustable shield to stop and direct the course of grain and impure particles on their way from the sieves, removable covering to protect the fan, and the pitman and rock-shaft, whereby vibratory motion is imparted to shaker from same shaft which drives the draft-fan.

Like letters refer to like parts.

By reference to the drawings, A represents our shaker; B, the hopper; A', pivot-joint of shaker; 1, first sieve; 2, second sieve; 3, third sieve; C, removable box; D, inclined bottom; E, adjustable shield; e, pin; F, rake; G, removable fan-covering; H, rock-shaft; H' H", arms of rock-shaft; V, pitman; K, driving-shaft; L, fan; S, draft-opening.

The construction of our invention is as follows:

Mounted in suitable frame-work we make a hollow casement with an inclined bottom, D, and a removable outside shield or fan-covering, G, this shield or fan-covering G being preferably connected to frame-work by hooks and eyes, as shown in Fig. 2. Inside of this casement, and hung upon the main driving-shaft of this machine, so as to rotate with said driving-shaft, is a fan, L. This casement to which we refer is made of side pieces, X X, inclined bottom D, fan-shield G, and a top portion, which is shown as between points Q Q in Fig. 5. This casement has an opening for the exit of the blast, which opening is shown particularly at S, Fig. 5. Shaker A is pivoted to a horizontal beam above this casement at point A', and the shaker is preferably so pivoted at that point that it can be taken off at will without dismantling the machine. The bottom of this shaker A to the point R (see Fig. 4) is inclined, and from that point, R, the bottom is horizontal. The shaker is divided into three compartments, B, Z, and W. Compartment B is the hopper into which the grain to be cleaned is first poured. This hopper is separated from the rest of the shaker by a cross-piece, $n$, having an opening, $n'$, for exit of grain, and the flow of grain through this opening $n'$ is regulated by a sliding door, $m$, hung in cross-piece $n$, this sliding-door being regulated and held in place by thumb-screw P. The next compartment of the shaker is compartment Z. This compartment at its bottom is provided with a removable sieve, 1. The sieve 1 is hung at an angle in compartment Z, so as to form the bottom of said compartment. The mesh of this sieve 1 is smaller than the mesh of the other sieves hereinafter mentioned. Between the compartment Z and the next compartment of shaker (compartment W) is a rake, F, to obstruct the passage of particles of straw and the like. This rake is hung horizontally, and is supported in slots in upright stanchions of the main frame-work of the machine, as shown in Figs. 3, 4, and 5. This rake is removable at will, and it is independent of the shaker. The next compartment of the shaker is compartment W. In the bottom of this compartment, preferably, are two removable sieves, 2 and 3; but only one sieve can be placed in this compartment, if desirable.

C is a removable box to receive the heavier particles of dirt and refuse matter in the operation of cleaning the grain. This box is inserted on top of the casement and between casement and shaker, just underneath compartment Z of shaker. Inclined bottom D of casement, beginning at end of compartment W of shaker, receives and carries off the cleaned grain.

E is an adjustable front shield. It works in a frame-work, E', and it is adjustable by a pin, e, passing through shield frame-work E', or by a thumb-screw, as desirable. The object of this front shield, E, is to intercept the particles of grain and impure matter that may pass off from the end of the shaker and direct their course to bags or other suitable receptacles. Vibratory motion is imparted to shaker A directly from main driving-shaft K, which drives fan L in the following manner: A pitman, V, is attached to the end of driving-shaft K. (See Figs. 2, 3, and 5.) This pitman V, at its other end, is attached to an arm, H', of rock-shaft H, rock-shaft H being set in bearings on the side of the frame-work, as shown in Fig. 2. To another and upper arm of rock-shaft H (arm H'') a short pivoted bar, o, is attached, and this short pivoted bar o at its other end is attached directly to a shaker, A. (See Fig. 3.) When driving-shaft K is rotated through pitman V, rock-shaft H and its arms, and pivoted bar o, vibratory motion is imparted to shaker A, pivoted at point A'.

The operation of our invention is as follows: Motion being imparted to main driving-shaft K in the ordinary manner by hand-power or by steam-power, the fan L revolves in the casement, creating a current of air, which finds vent through the opening S of the casement, directly through seive or seives 2 and 3, and at the same time vibratory motion is imparted to pivoted shaker A from main driving-shaft K, through pitman V, rock-shaft H, and rock-shaft arms H' H''. Then the operation of cleaning the grain takes place. The grain having been poured into hopper B, by its own gravity and vibration of the shaker passes into compartment Z through opening n'. This compartment Z, having a sieve bottom, and being also vibrated, serves to retain and separate the heavier particles of foreign matter from the grain in its passage through this compartment, these heavier particles of foreign matter dropping through sieve 1 of this compartment Z into removable box C; and pieces of straw that may come into this compartment are stopped in their progress by rake F. From this compartment Z the grain being cleaned, together with such foreign matter as has not fallen into box C or been stopped in compartment Z by rake F, is carried into compartment W of shaker A, which compartment is also being vibrated. In this compartment W the grain is completely cleaned and separated from foreign matter. There being a flat bottom to this compartment, and preferably two sieves forming this bottom, the grain passing in from compartment Z is thoroughly shaken on the sieves in this bottom, and the dirt and foreign matter in this compartment are thus separated from the grain. The cleaned grain falls through the sieves upon the inclined bottom D of the casement, and, following along the line of this inclined bottom, is let out at tail of machine under fan-shield G at g of Figs. 2 and 4, and the light particles are carried off the sieves in this compartment W and away from machine by the blast passing up through the sieves in the opening S of the casement. The grain that does not pass through the sieves in compartment W by the vibratory motion of shaker is carried off compartment W, and, striking the face of adjustable shield E, follows the line of this shield and is discharged at e', Figs. 2 and 4, and particles of foreign matter not deposited in the box C, or driven off the sieves in compartment W by the blast, are also carried along the line of shield E to point e', where, together with the grain, they may be gathered to go through the process of cleaning again, if desirable. In effecting this object the interception of grain and other particles, the front shield, E, can be lifted or lowered, as desirable.

The sieves used in the different compartments are regulated as to the size of their mesh by the nature of the seed or grain that it may be desirable to clean.

We claim—

A grain-cleaning machine comprising pivoted shaker A, provided with compartments B, Z, and W, and having cross-piece n, door m, and sieves 1, 2, and 3, the removable box C, rake F, the casement, the fan L, the main shaft K, pitman V, rock shaft H, having arms H' H'', inclined bottom D, blast-exit S, removable fan-casing G, and adjustable shield E, substantially as described.

In testimony whereof we have affixed our signatures in presence of two witnesses.

JOHN D. + HASSELBUSCH.
his mark.
HERMANN HASSELBUSCH.

Witnesses:
PAUL BAKEWELL,
FERDINAND HASSELBUSCH.